United States Patent [19]

Drogin

[11] Patent Number: 4,595,992

[45] Date of Patent: Jun. 17, 1986

[54] ENCODING AND DECODING DEVICE FOR NARROW BANDWIDTH COHERENT SIGNALS

[75] Inventor: Edwin M. Drogin, Dix Hills, N.Y.

[73] Assignee: Eaton Corporation, Cleveland, Ohio

[21] Appl. No.: 385,900

[22] Filed: Jun. 7, 1982

[51] Int. Cl.[4] .................. G01R 23/00; G04F 10/04
[52] U.S. Cl. ........................... 364/569; 364/484
[58] Field of Search ............... 364/480, 484-487, 364/556, 569, 570; 377/9, 10, 54; 455/158; 375/82; 178/69 G, 69 M; 324/78 R, 79 D, 79 R; 307/231, 517

[56] References Cited

U.S. PATENT DOCUMENTS

| | | | |
|---|---|---|---|
| 3,304,504 | 2/1967 | Horlander | 324/79 D |
| 3,971,994 | 7/1976 | Shepherd | 324/79 D |
| 4,137,497 | 1/1979 | Lowenschuss | 324/79 D |
| 4,420,809 | 12/1983 | Pierce | 364/484 |

Primary Examiner—James D. Thomas
Assistant Examiner—Dale M. Shaw
Attorney, Agent, or Firm—Andrus, Sceales, Starke & Sawall

[57] ABSTRACT

A signal to be measured is limited and supplied to the clock inputs of a series of high speed D-Flip-Flops. The D input of the Flip-Flops are simultaneously supplied with signals from a Clock by way of taps on a Delay Line. The state of the Flip-Flops accurately represent in digital form the time of occurrance of selected leading edges of the signal to be measured with a resolution of one nanosecond. Each such time of occurrance measurement is substracted from the previous measurement to determine the period of the signal to be measured. The resulting period data is stored and scaled, making it available to precisely reproduce the received signal in frequency and phase in one half cycle period steps.

8 Claims, 13 Drawing Figures

ENCODING AND DECODING DEVICE FOR NARROW BANDWIDTH COHERENT SIGNALS

BACKGROUND

1. Field

The present invention relates to means for digitally encoding and decoding RF signals and, more particularly, to the encoding and decoding of pulsed, high frequency, RF signals using a minimum number of bits.

2. Prior Art

A well known system incorporating a delay line for encoding, storing and reproducing an RF signal is illustrated in FIG. 7. The apparatus in this Figure comprises a receiver 701, a Switch 702, an Amplifier 703, a Circulating Delay Line 704, and a Switch 705. In the operation of this system, a received RF signal is passed from the Receiver 701 through the First Switch 702 and Amplifier 703 into the Delay Line 704 which circulates the received signal back through Amplifier 703 and then back to the beginning of the Delay Line. The circulating signal may be sampled at output port 706 at the output of the Second Switch 705. A signal once admitted to the Delay Line tends to circulate about the Delay Line until it is overridden by noise, which typically occurs within ten circulations through the line.

A second prior art system, shown in FIG. 8 comprises a Receiver 801, a Discriminator 802, a Storage Unit 803, a Comparator 804, a Voltage Controlled Oscillator 805, a Switch 806, and a Switch 807.

In the operation of this system, a signal transmitted from the Receiver to the Discriminator 802, produces an output voltage that is placed into storage by way of Switch 807. To reproduce the received signal, the stored voltage (or its digital equivalent) is supplied to the Comparator. Switches 806 and 807, which are ganged, are then set to the position which transmits the output of the Discriminator to the Comparator. The Comparator output is fed to the Oscillator 805 for use as a frequency control voltage. The Oscillator output is fed back by way of Switch 806 to the Discriminator 802.

The combination of the Discriminator, Comparator and Oscillator, arranged to transmit the output of the Voltage Controlled Oscillator back to the Discriminator, forms a feedback loop which causes the Oscillator to be driven to the frequency which produces the same discriminator output voltage as was produced by the original signal. In this way, the Oscillator is caused to operate at or near the frequency of the received signal.

The accuracy to which this system can reproduce the original signal is limited by the resolution of the Discriminator which may typically range from one to five percent of the Discriminator bandwidth. If the Discriminator is of the type that includes rectifiers and filters, a number of cycles are required before the Discriminator can produce an output voltage at the frequency of the received signal. Where a pulsed signal is applied to the Discriminator, the delay in producing the output voltage may be so long as to prevent arriving at the final value. Discriminators that are capable of providing an instantaneous output are available; however, the instantaneous feature solves only one problem. The resolution of such Discriminators is not necessarily improved over those Discriminators which take a longer period of time to arrive at a final output level.

There are, in addition, other significant sources of error. The Voltage Controlled Oscillators in these circuits drift and there is an error voltage inherent in the feedback loop, both of which add to the error caused by the Discriminator's resolution and drift, affecting the final reproduction of the signal frequency by this system. Where a received pulse contains FM modulation, this system is entirely inadequate to properly process such a signal.

A third type of prior art system commonly referred to as a phase locked system is shown in FIG. 9. In this Figure, the system is shown to comprise a Receiver 901, a Phase Detector 902, and a Voltage Controlled Oscillator 903.

In the operation of this system, a signal from the output of the receiver is fed to the Phase Detector. The DC output 904 of the Phase Detector is used to control a Voltage Controlled Oscillator whose RF output 905 is returned to the Phase Detector. The output of the Phase Detector drives the Voltage Controlled Oscillator to the frequency of the incoming signal from the receiver.

The deficiencies of the system shown in FIG. 8 generally apply to the phase locked system as well. In addition, there is no storage provided for the received signal. Once the input signal has been removed, there is no means provided for retaining the signal. This defect can be remedied by adding a memory which stores the final control voltage produced by the Phase Detector. However, any drift in the Voltage Controlled Oscillator, after the input signal has been removed, adds directly to the error in the frequency of the replicated signal.

A fourth type of prior art system generally referred to as a digital sampling system is shown in FIG. 10. In this Figure, a square wave 1003 is plotted on a coordinate axis consisting of an ordinate 1001 representing amplitude, and an abscissa 1004 representing time.

In this system, continuous samples of a constant amplitude square wave are taken. The samples are represented by the points along the wave such as points 1002. If the sampling rate is much higher than the frequency to be replicated, the signal may be replicated to any desired frequency accuracy. The polarity of the square wave at each sample instant may be stored as a binary one or zero, providing information with which to reproduce the signal for as long as desired. Unfortunately, this system is one of the least economical in the use of storage, requiring a large and costly storage capability to be functional, since there must be a number of samples per cycle of square wave in order to replicate the original signal with high accuracy. This system also requires very high sampling rates, which may be beyond the state of the art where the signal to be replicated is at a high frequency, since for example over 1000 samples per cycle of square wave is required for 0.1 percent frequency accuracy when measuring one square wave cycle.

SUMMARY

It is an object of the present invention to provide a frequency replication system which can accurately reproduce a received signal with a sample as small as one-half cycle.

It is an object of the present invention to provide a system for accurately replicating such a signal indefinitely.

It is an object of the present invention to provide a CW coherent replication, synchronized in both phase and frequency to a sample of an RF pulse or CW input.

It is an object of the present invention to provide a system capable of instantaneously encoding a received signal.

It is an object of the present invention to provide a capability for replicating either CW or FM modulated or bi-phase coded signals.

It is an object of the present invention to encode and replicate such received signals using an information theoretic minimum of digital storage bits, related only to the bandwidth of the received signal.

A principal purpose of this invention is to accurately replicate short pulsed signals, without accurate apriori knowledge of the frequency. In this invention, the input signal, usually a pulsed RF signal, is received by a Superheterodyne Receiver where it is down converted to a relatively low IF frequency, such as 5 megacycles. To acquire the input signal, the LO is tuned or selected by synthesizer techniques to a frequency which is within 1 to 2 megacycles of that required to produce the IF center frequency of 5 MHz. Since the LO has to be very stable but does not have to be accurately set at a frequency which will produce an output precisely at the IF center frequency, tuning can be accomplished rapidly, an important factor where the input signal is of short duration. A coarse measurement of the period of each cycle of the down converted signal is obtained by counting the number of clock signals occurring between its zero crossings, where the Clock is a precision device operating at a frequency which is appreciably higher than the IF frequency.

To provide a finer measurement of the time between zero crossings, the period of the clock signal is divided by means of a Tapped Delay Line, where the taps are set apart by short time intervals, such as 1 nanosecond. The coarse and fine measurement of the difference between the zero crossing times is stored and may be drawn upon to accurately replicate the input signal for as long as desired.

A replica of the original signal is produced with the aid of a switching device that is caused to alternate in accordance with the stored period data, producing a square wave at the precise frequency of the down converted signal. This replicated signal at the IF frequency is then up-converted using the same Local Oscillator to produce a signal at the frequency of the received signal. The local oscillator frequency can be selected by means of a crystal controlled or other precision synthesizer. Since both the Local Oscillator and Precision Clock can be of very high stability, the up-converted replication frequency can be accurately reproduced. In addition, the period data is stored, making it possible to produce the replicated frequency for as long as desired.

DETAILED DESCRIPTION OF THE INVENTION

Figure 1:
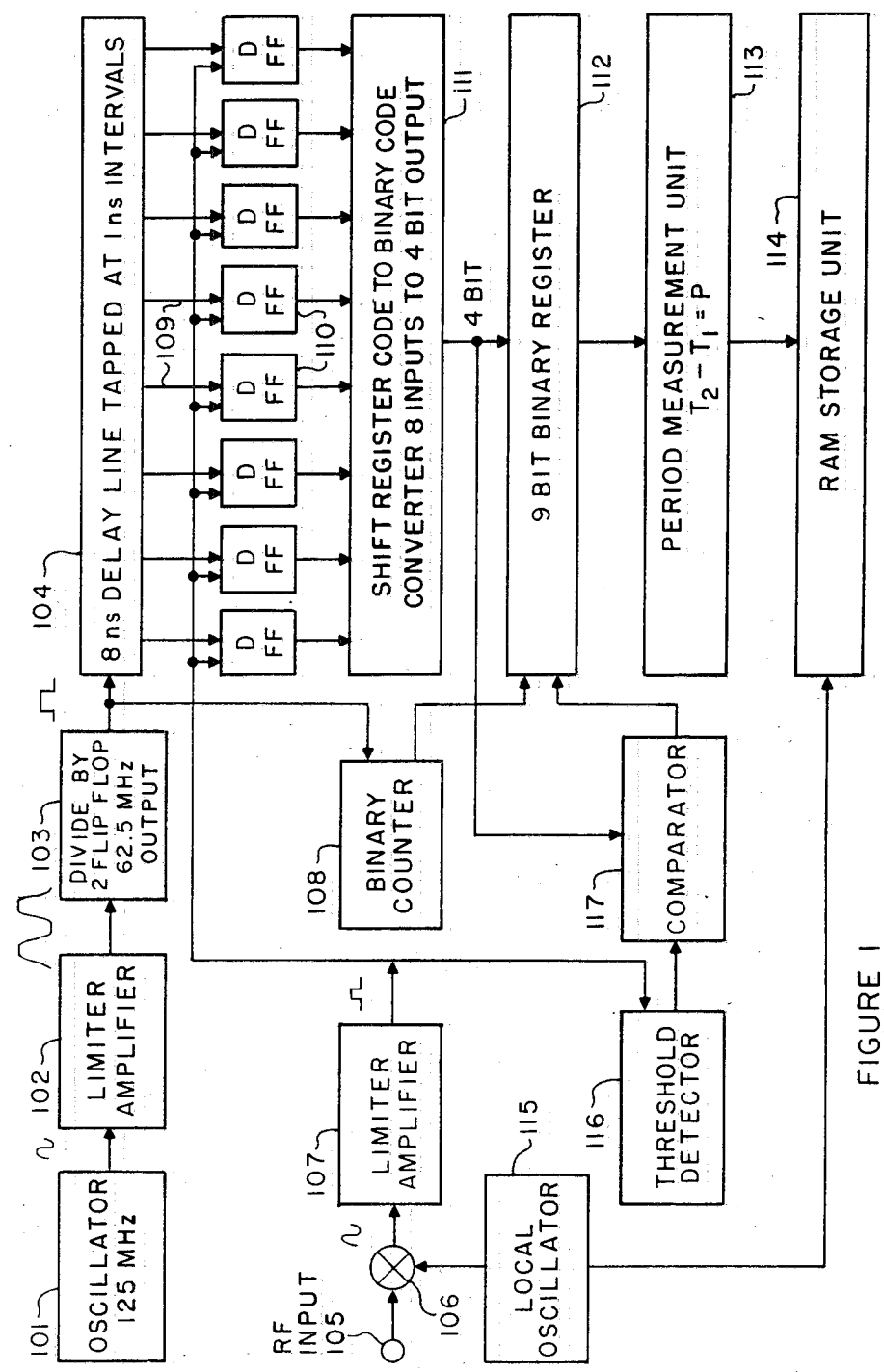
FIG. 1 is a block diagram of the encoder section of a specific embodiment of the invention.

FIG. 1 is a detailed block diagram of one embodiment of the invention. From this Figure, it can be seen that this embodiment comprises a Clock Oscillator 101, a Limiting Amplifier 102, a Divide-By-Two Flip-Flop 103, an Eight Nanosecond Tapped Delay Line 104, an RF input port 105, a Mixer 106, a Limiting Amplifier 107, a Binary Counter 108, a series of tapped output ports of the Eight Nanosecond Delay Line 109, a series of eight D-Flip-Flops 110, a Shift-Register-Code-To-Binary-Code-Converter 111, a Nine Bit Binary Register 112, a Period Measurement Unit 113, a RAM Storage Unit 114, a Local Oscillator 115, a Threshold Detector 116, and a Comparator 117.

It should be noted that the basic performance of the specific embodiment is determined by the characteristics of the Flip-Flop 103 and similar Flip-Flops 110. The higher the frequency capability of the Flip-Flops, the greater the accuracy that can be obtained with this system.

In the operation of the Encoding system of FIG. 1, an unknown RF signal supplied to port 105 is down converted in Mixer 106 to an IF frequency in the range of 5 MHz. This IF signal is passed through Limiting Amplifier 107 and to the clock input ports of the D-Flip-Flops. The D-Flip-Flops also receive at their D-input ports, the output signals on the tapped output ports of the Delay Line 104. The input signal to the Tapped Delay Line is supplied by the Clock Oscillator 101, by way of the Limiting Amplifier 102 and the Divide-By-Two Flip-Flop 103. The output signal of the Divide-By-Two Flip-Flops 103 is a fast rise time square wave which is transmitted down the delay line.

The output of the taps on the Delay Line is either a "one" or a "zero", depending on the location of the square wave on the line at any one instant. When there is coincidence between a leading edge of the down converted signal and the square wave on a tap of the delay line, the outputs of the D-Flip-Flops provide an indication of this coincidence, which is then transmitted through the Shift-Register-Code-To-Binary-Code-Converter, and the Nine Bit Binary Register to the Period Measurement Unit 113.

As a specific example of the operation, the Tapped Delay Line 104 is taken as having eight taps, each of which is separated by a one nanosecond delay, to provide eight bits of input to the Shift-Register-Code-To-Binary-Code-Converter 111, from which there is a four bit binary output that is supplied to the Nine-Bit-Binary-Register 112. The Nine-Bit-Binary-Register is also supplied with a 5 bit output of the Binary Counter 108, which represents the number of cycles of the square wave supplied to the Delay Line up to the time of coincidence. The output of the Nine-Bit-Binary-Register represents the number of cycles, and fraction thereof, of the square wave input to the Delay Line to the occurrance of a positive going zero crossover of the down converted IF. This data is placed in the Period Measurement Unit 113. In a similar way, at the next positive going zero crossover of the down converted IF signal, another measurement is made and the result is again supplied to the Period Measurement Unit 113. The Period Measurement Unit subtracts these two recorded times to measure the period of the down converted signal. The output of the Period Measurement Unit is fed to the RAM storage unit 114, which stores this data.

The Threshold Detector 116, which receives the output of the limiting amplifier 107, and Comparator 117 combine to prevent a data error which may occur if the nine bit Binary Register is loaded before the Binary Counter has transitioned to the correct count. A more detailed description of the Comparator's operation is provided below in connection with the description given in connection with FIGS. 12 and 13.

The Local Oscillator 115 incorporates means for rapidly synthesizing a local oscillator frequency which places the IF frequency within three megacycles of the desired IF center frequency. The Local Oscillator supplies LO power to the Mixer 106 and contains circuitry to supply a digital signal representing the LO frequency to permit this frequency to be reproduced at a later time.

Figure 2:
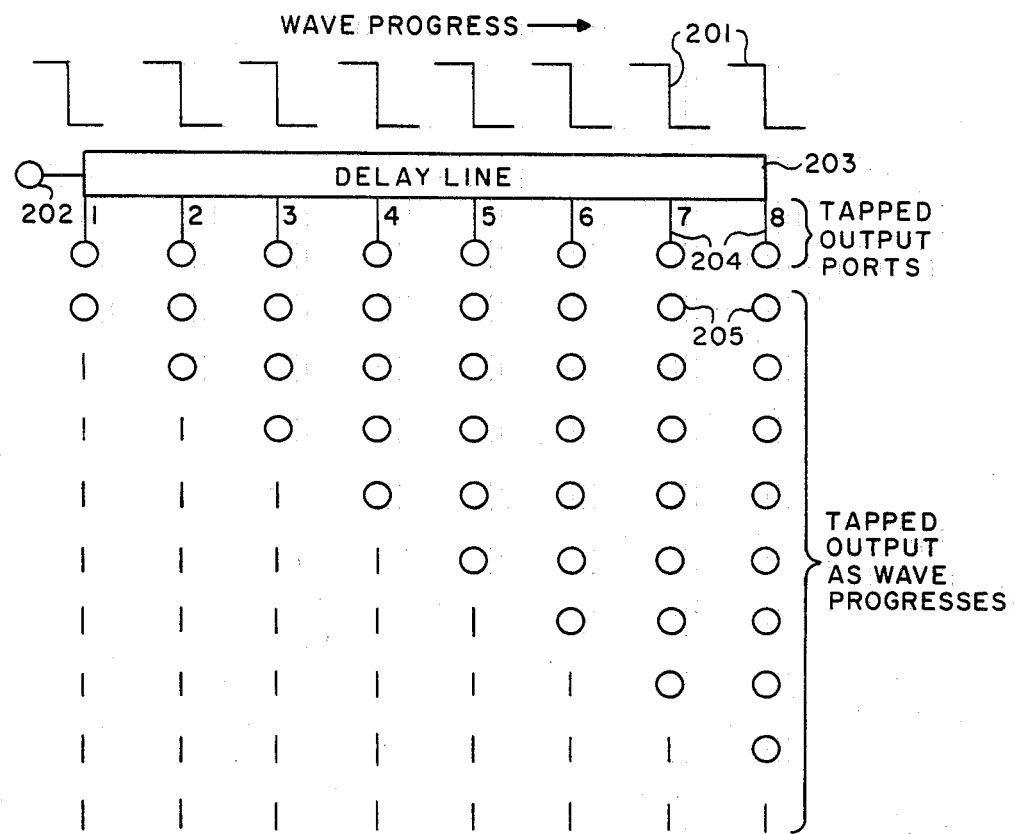
FIG. 2 is a diagram illustrating the way in which a Tapped Delay Line may produce a digital signal representing time of occurrence.

FIG. 2 is a pictorial diagram of a Delay Line illustrating the progress and effect of a square wave signal traveling down the Delay Line. This diagram comprises a square wave 201, shown at various points along the Tapped Delay Line 203. The line includes eight tapped output ports 204, from which are produced a series of output signals 205 that depend for their value ("0" or "b 1") on the position of the square wave on the Delay Line 203.

The first row of output signals is shown in this diagram to be all zeros, representing the case where the positive half cycle of the wave has not entered the line. The second row is again all "zeros", except for the first tapped output port, which in this case, is a "one", indicating that the signal has just passed the first tapped output port, but has not yet reached the second output port. The third row shows a "one" on the first and second tapped output ports while the rest of the tapped outputs are "zero", indicating that the wave has passed by the first and second output ports but has not yet reached the third. The "ones" continue to progress across the rows from left to right in "shift register" fashion as the signal progresses down the line, until finally the last line shows all "ones". Where the wave has a half period equal to the total delay time of the line, the wave will begin to progress off the line so that its trailing edge will first pass the first tapped output converting that to a zero, and then the second port also, eventually converting that and all tapped outputs to zeros as is now shown in the first row of the output signals 205.

In the present invention, the particular output configurations of "ones" and "zeros" is stored at the time the selected edges of the down converted signal occur. Since each configuration is unique and represents a specific time accurate to a nanosecond, the period of the down converted RF signal can be measured accurately to a nanosecond.

In the specific example used herein, the Tapped Delay Line is taken as being eight nanoseconds in length. If the input signal to the Line is taken as 62.5 MHz, then the half period of this signal is eight nanoseconds. As discussed above, the unique configuration of the Tapped Delay Line output signals at the times of positive zero-crossings of the down converted signal are received, makes it possible to determine the time of occurrence at these zero-crossings to within one nanosecond and thus provide the data from which one cycle period or a number of cycle periods of the down converted signal may be measured to the same accuracy.

Figure 3:
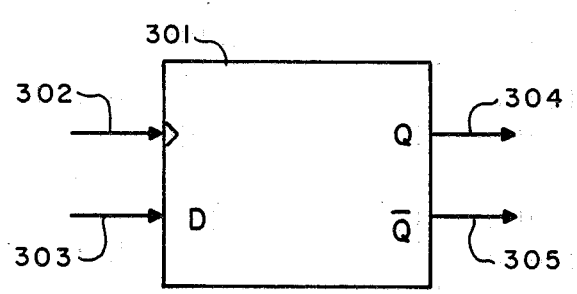
FIG. 3 is a block diagram of a D-Flip-Flop.

FIG. 3 is a diagram of a D-Flip-Flop 301 having a clock input port 302, a D-input port 303, a Q output port 304 and a Q output port 305.

The clock input port 302 should not be confused with the clock signal. The "clock" input port is merely standard terminology for this port. It does not have to receive a clock signal and in the present invention it does not receive a clock signal, rather it receives the selected edges of the down converted signal.

In the normal operation of a D-Flip-Flop, a pulsed signal comprising a series of positive going leading edges is supplied to port 302. If a "one" is present at the D-input 303 prior to the arrival of a positive leading edge into port 302, the Q output 304 will transition to and remain at the "one" state until it receives another positive leading edge after a "zero" is present at D-input 303. Thus, the Q output port 304 follows and holds the state of D-input port 303 (the position of the wave on the Tapped Delay Line) at each positive going signal edge (the down converted signal's leading edge) into port 302 and holds it so that there will be sufficient time for the shift register 111 to receive and accept that position of the wave on the Delay Line.

In the circuit of FIG. 1, the D-input port of each D-Flip-Flop is connected to one output tap of the eight nanosecond Tapped Delay Line 102, while all the clock input ports are connected to receive the selected edges of the down converted signal. This arrangement causes the series of ones and zeros, shown in the output taps of the Tapped Delay Line in FIG. 2, to be supplied to the D-input ports. When there is no clock input port signal from the down converted signal supplied to the clock input port, the outputs of the D-Flip-Flops do not change, whereas when a positive going leading edge is supplied to the input clock ports from the down converted signal, the outputs switch and hold the switched position, thereby recording the position of the wave on the Delay Line at the times of occurrance of the leading edges of the down converted signal. The signal transmitted from the outputs of the D-Flip-Flops represents the position of the square wave on a line and thus a fine measurement of the times of occurrance of the leading edges of the down converted signal.

Since the D-Flip-Flops are arranged to actuate on a positive going leading edge of the down converted signal, they will only hold the data on the Delay Line taps at the beginning of each cycle when a positive leading edge is received. In order for this system to measure only a half cycle of the down converted signal, it is necessary to convert the negative going leading edges to positive going leading edges in inversion circuitry contained within the Limiting Amplifier. Such circuitry is conventional. For example, a Flip-Flop may be arranged to be triggered only by negative going leading edges rather than positive going edges. To compensate for the delay in this Flip-Flop, the normal positive going leading edges of the down converted signal are passed through a Delay Line with a delay equal to that of the delay of the Flip-Flop. The inherent positive going leading edges are combined with those produced from the negative going edges to provide the output of the Limiting Amplifier.

To simplify the description of the system, the D-Flip-Flops and the Comparator will be considered as being actuated by the "leading edges" of the down converted signal. Such terminology is intended to mean either positive or negative leading edges where there is inversion circuitry and one-half cycle is measured by the system, or only positive going leading edges where there is no inversion circuitry and only full cycles are measured.

Note that it is possible to measure the period of several cycles of the down converted signal and determine the period of one cycle by dividing by the number of cycles measured. In that case, the above description of operation applies with the exception that every leading edge is not recorded, the number being missed corresponding to the number of cycles or half cycles to be counted. A more complete description of this system variation is described later.

The remaining or coarse measurement for the occurrance times of the leading edges of the down converted signal is provided in a conventional way by the clock signal supplied from Divider 103 to the Binary Counter 108. The clock is free running and the Counter merely continues to count the output of the Clock until it has reached its maximum count. The Counter then resets itself and continues to count. The Counter output, which is supplied to Register 112, is simply an arbitrary reference count reached when a leading edge from the down converted signal is received. The next leading edge occurs at a later time and a correspondingly higher count. The differences between these two counts represents the time between the selected leading edges of the down converted signal. Since each count represents a unit of time equal to the Clock period, the time between the leading edges is simply the count difference multiplied by the Clock period. This count difference provides a coarse measure of the time between leading edges because it is only accurate to within one clock period.

On the other hand, the output from the Tapped Delay Line, as detected by the D-Flip-Flops, records the fraction of the Clock period at which a leading edge occurs and is therefore a fine measurement, with the resolution determined by the Line length and the number of taps.

In the specific embodiment of FIG. 1, the Line length is 8 ns and it is divided by eight taps spaced 1 ns apart. The Line delay is equal to one-half the Clock period. A full Clock period line could be used, however, it is unnecessary because a one-half period line provides an unambiguous output for any position of a complete cycle of the clock signal. This can be seen from the diagram of FIG. 2. For the 8 ns Line with 1 ns taps, the occurrance time of a leading edge of the down converted signal can be determined to within 1 ns. Thus, when the Clock count from Counter 108 and the output of the Tapped Delay Line are supplied in combination to the Register 112, a measurement of the occurrance of a leading edge to within 1 ns is provided.

When more than one-half cycle of the down converted signal is available, the average half period can be measured to a fraction of a nanosecond, the fraction being equal to the reciprocal of the number of half cycles available. This may be understood by considering the case where four half-cycles of the down converted signals are measured rather than one. In that case, the time for the four half-cycles will be measured with the system shown in FIG. 1 to within 1 ns. The average time for one half-cycle is obtained by dividing the time measured for four half-cycles by four. This will also divide the 1 ns resolution interval by four, improving the accuracy of measurement of one half-period to one-quarter ns.

The determination as to how many half-cycles are to be averaged is contained in circuitry within the Threshold Detector 116. Conventional circuitry may be used, such as a Counter, which is set to count the number of half-cycles of the down converted signal to be averaged before a load pulse is sent out from the threshold circuit through the Comparator to the Register 112. Until the load pulse is received by the Register, no data is entered into the Register. In this way, a number of leading edges may pass and not be entered until the number to be averaged has been reached. At that point the count in the counter and the output of the Tapped Delay Line is then entered into the Register 112. The time between a first leading edge and the next leading edge permitted to be entered into the Register is then the total time for the number of half-cycles of the down converted signal selected to be averaged by the Threshold circuit. In the Decoder Section, which will be described in detail later, this total time will be divided by the number of half cycles averaged to replicate the half-cycle period of the down converted signal. The accuracy of the replicated half-cycle period is then equal to the time between taps on the Delay Line, divided by the number of half-cycles averaged.

It should be noted that all of the circuitry shown in FIG. 1 is often desirable, but not always necessary for the operation of this system. For example, the Shift-Register-Code-To-Binary-Code-Converter 111 is simply a means of reducing the eight bits from the Flip-Flops down to four bits. This reduction in the number of bits permits the use of a smaller Register 112.

To simplify the general description and the language in the claims, the Converter 111 will be considered as also including the special case where there is in fact no actual conversion. In this special case, the Converter would only include a wire connection from the output of the Flip-Flops to the Register 112.

The RAM Storage Unit 114 is another component which could be eliminated from the system in certain cases. To again simplify language, the recital of this component will be considered as including the special case where there is actually no RAM Storage Unit. In this case the RAM storage would consist of only a wire connection for the output of the Period Measurement Unit 114. An actual RAM Storage Unit is useful in a number of cases, however. It is particularly useful where more than one cycle of information is to be stored, as in the case of an FM signal, or where the information from multiple signals must be preserved for later use.

The Comparator 117 is another component which also could be eliminated if a Binary Counter could be fabricated with nearly zero settling time. Unfortunately, all known Counters have a finite settling time during which they produce erroneous indications of the count. If an output were accepted from the Counter during its settling time, the results would be totally inaccurate, making the system unworkable.

In view of this, the Comparator 117 is a key element in a practical system. The theory of operation of the Comparator may be explained with the aid of FIG. 13. This Figure comprises an ordinate 1301 representing amplitude, an abscissa 1302 representing time, a first square wave 1306, an interwave period 1307, and a second square wave 1308. The square waves 1306 and 1308 and the interwave period 1307 represent the periodic square wave produced by the Clock. The leading edge of the first and second square waves are designated by drawing numerals 1303 and 1305 respectively, while the trailing edge of the first square wave is designated by drawing numeral 1304. The first half of the first cycle is designated by drawing numeral 1309, while the second half is designated by drawing numeral 1310.

The Counter 108 receives the leading edge of the first square wave and begins its counting and settling process. Typically, the settling process will be completed by the time the second half of the wave 1310 has occurred. This time is conveniently indicated by the Tapped Delay Line 104 which receives the clock signal at approximately the same time as the Counter. The position of the wave along the Tapped Delay Line is indicated by the output of the Shift-Register-Code-To-Binary-Code-Converter 111. The most significant bit (MSB) of this output is sufficient to indicate whether or not the first half 1309 has passed. This signal is referred to as the second-half indicator signal.

Figure 12:
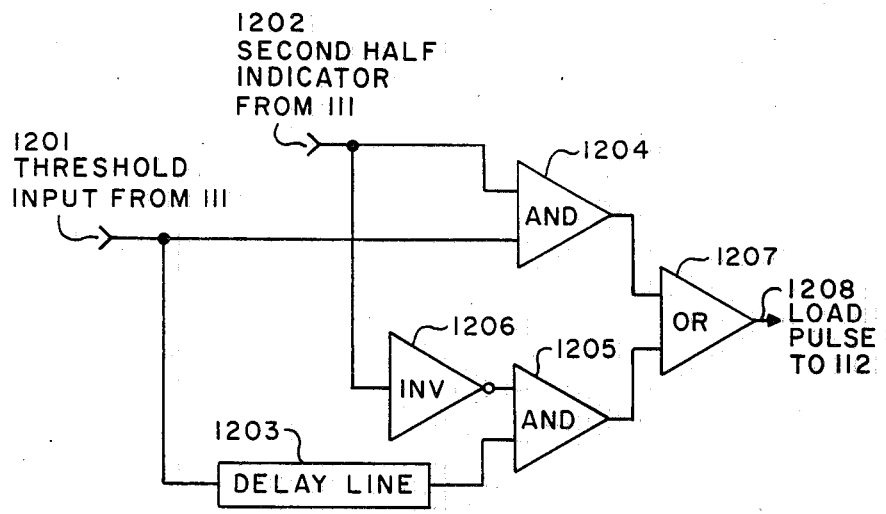
FIG. 12 is a detailed circuit diagram of the Comparator 117 in FIG. 1.
Figure 13:
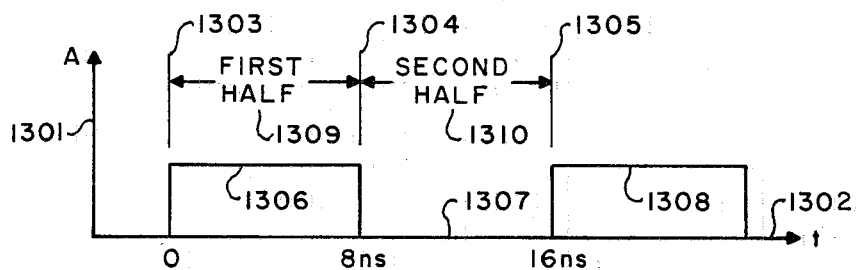
FIG. 13 is a plot of the clock pulse entering the Comparator, indicating the time at which the Comparator will transmit an output load pulse.

Typical circuitry which may be used in the Comparator 117 is shown in FIG. 12. This circuitry comprises a first input port 1201, a second input port 1202, a Delay Line 1203, a first AND Gate 1204, a second AND Gate 1205, an OR Gate 1207 and an output port 1208.

In the operation of this circuit, the output of the Threshold Detector 116 is received at the input port 1201 and passed directly to the AND Gate 1204. If the second half indicator signal from Register 111 is present and is received at the second input port 1202, it is passed directly to the first AND Gate 1204 to produce an output which is transmitted through the OR Gate 1207 to form at the output port 1208 the load pulse, which is then transmitted to the Register 112. Direct and almost instantaneous production of the load pulse is correct under these conditions since the second half of the clock period has occurred and the counter will have settled.

When the second half indicating signal is not present, the signal from the Threshold Detector 116 is passed through Delay Line 1203 to the second AND Gate 1205. The absence of the second half indicating signal at port 1202 is held throughout the clock cycle and produces an inverter output which is sustained through this period, activating the second AND Gate and allowing the delayed signal from the output of the Threshold Detector to pass through the OR Gate 1207 to the output port 1208. The delay in Delay Line 1203 is equal to one-half of the Clock period, insuring that the load pulse will not be produced until the second half of the clock period is present, at which time the counter will have settled.

Although Binary Counters and Registers have been shown in all examples, it is understood that Counters and Registers of other bases may be substituted without departing from the invention. Such devices will be referred to simply as Counters and Registers without noting the numerical base.

The above completes the description of a specific embodiment of the Encoder Section whose function is the accurate measure and storage of the received signal period in digital form within the RAM Storage Unit 114. The principal purpose in storing such data is the accurate reproduction of the received signal, whenever desired, for as long as desired. The reproduction function is carried out in the Decoder Section, a specific embodiment of which is illustrated in the block diagram of FIG. 4.

The Decoder portion of this system converts the period information stored in RAM Storage Unit 114, shown in FIG. 1, to a reconstituted signal with zero crossings separations that are identical to the original signal to an accuracy (for the specific embodiment of the decoder in FIG. 4) of one-quarter of a nanosecond, which is four times the accuracy of the stored period information.

Figure 4:
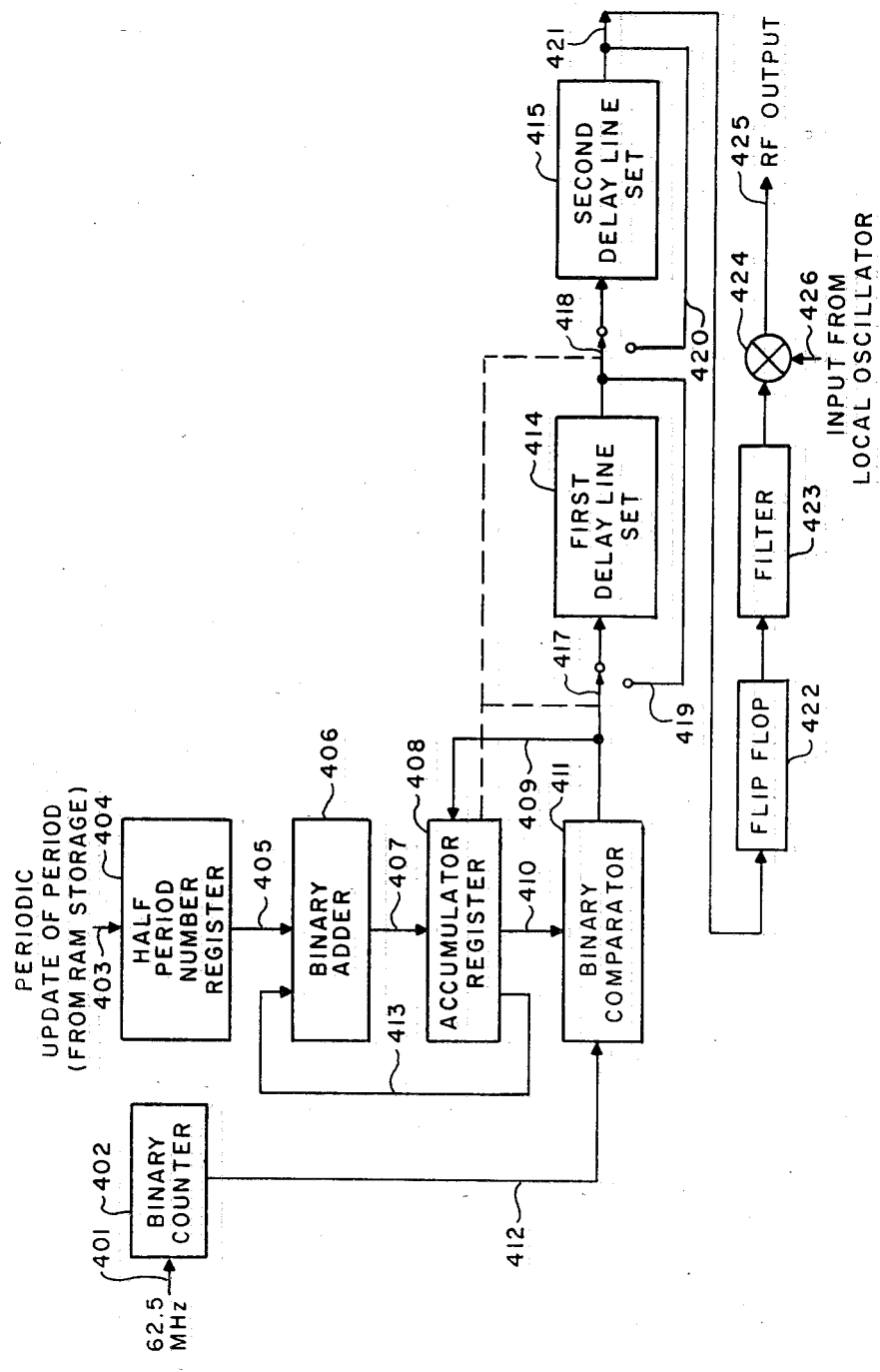
FIG. 4 is a block diagram of the Decoder section of a specific embodiment of the invention.

The block diagram of the decoder portion of the system presented in FIG. 4 shows the decoder to comprise a Half-Period Number Register 404, a Binary Adder 406, an Accumulator Register 408, a Binary Comparator 411, a First Delay Line Set 414, a Second Delay Line set 415, a First Switch 417, a Second Switch 418, an output port 421 from the Second Delay Line Set, a First Bypass Line 419 connected to one contact of the Switch 417 and to the output of the First Delay Line Set, a Second Bypass Line 420 connected to one contact of the Second Switch 418 and to the output of the Second Delay Line Set, a Flip-Flop 422, a Filter 423, a Mixer 424 and an output port from the Mixer 425.

In the operation of the Decoder, a 62.5 MHz signal, taken from the output of the Divide-By-Two Flip-Flop 103, shown in FIG. 1, is fed to the Binary Counter 402 by way of line 401. This Counter can be Counter 108 on FIG. 1 or a separate Counter, depending on the application. The output of the Binary Counter is then fed through Binary Comparator 411 by way of line 412. The period of the down converted signal, which is stored in RAM Storage Unit 114 in FIG. 1, is supplied by a line 403 as a periodic update to the Half-Period Number Register 404.

The RAM Storage Unit data, which represents the time for two full cycles of the original down converted RF signal, in this example, is divided by four to provide a measure of a one-half period signal to an accuracy of one-quarter nanosecond. The output of the Number Register is fed by way of path 405 to the Binary Adder 406 whose output is then fed by way of Path 407 to the Accumulator Register 408. One output of the Accumulator Register is fed by Path 413 back to a second input of the Binary Adder, while the other output is fed to the Binary Comparator by Path 410.

The Binary Comparator compares the number in the Accumulator Register with the count from the Binary Counter to produce a series of pulses at the Switch 417. These pulses correspond nominally to the zero-crossings of the reconstituted down converted signal (coarse reproduction).

The Accumulator Register also stores data relating to a more precise location of the zero crossing (fine data) derived in part from the Delay Line 104 in FIG. 1. This data is fed from the Accumulator Register through a separate system indicated by the dashed lines 416, which actuate the Switches 417 and 418 for the first and second Delay Line Sets. These Switches and Delay Line Sets are capable of adding a delay to the pulses emanating from the Comparator by an amount dictated by the fine data. The output pulse train resulting from this adjustment in pulse delay is fed to the port 421. This signal is a pulse train in which the pulses are separated by a time equal to a half period of the down converted RF signal with an accuracy of one-quarter of a nanosecond.

To convert the pulse train into an exact replica of the received signal, the pulse train on line 421 is passed to Flip-Flop 422, converting the pulse train into a square wave which is passed through Filter 423, converting the square wave to a sinusoidal wave. This sinusoidal wave is mixed in Mixer 424 with a signal from Local Oscillator 115 in FIG. 1 to upconvert it to the frequency of the signal received at RF input port 105. Since the zero-crossings are virtually identical to the received signal, and the local oscillator signal used for down conversion is again used for upconversion, a nearly perfect reproduction of the received signal is produced. In addition, the information for this signal is stored and can therefore be used to reproduce the received signal for as long as is desired without deterioration.

A specific embodiment of the Decoder will now be described in detail. As noted above, the Input Encoder of the example measures the period of two cycles of an input sine wave which has been converted to a square wave by hard limiting. Assuming the input sine wave frequency to be exactly 5 MHz, and the measurement encoded in binary form with a least significant bit of one nanosecond, the value in storage will be 110010000, representing precisely 400 nanoseconds. Since a half-period of the input sine wave has a duration precisely equal to two periods divided by four, the measurement in storage need only be divided by 4 to represent the time between two successive zero-crossings.

Dividing a binary number by 4 requires no actual operation except a "phantom" shift of the assumed position of the binary point. In other words, the half-period value of 100 nanoseconds in the example can be represented by the binary number 1100100.00, which is identical to the number representing 400 nanoseconds above, except that the binary point has been shifted two places to the left, indicating the bit directly to the right of the binary point has a weight of 0.5 nanoseconds, and the least significant bit has a weight of 0.25 nanoseconds.

As an additional example, assume the two-period measurement resulted in a binary number 110010011 representing 403 nanoseconds. Dividing or scaling this result by 4 gives 1100100.11, which is equivalent to 100.75 nanoseconds. The next step in the decoding process is to compare this half period value with the output of a Counter. As a simple example, assume that a Binary Counter is available whose most significant bit output represents 512 nanoseconds and whose least significant bit output represents 0.25 nanoseconds (12 bit counter). If the initial one-half period value is 1100100.11 (100.75 nanoseconds), a pulse will be transmitted from the output of the Binary Comparator when the counter has counted to a value of 01100100.11. As soon as this pulse has been transmitted, the one-half period value is added to itself by means of the feedback path to the Binary Adder and the result stored in the Accumulator Register 408.

The result of the first addition will be 11001001.10 (201.5 nanoseconds). Thus, precisely 100.75 nanoseconds later, another pulse will be transmitted from the output of the Binary Comparator 411. As soon as this pulse occurs, the one-half period value is added to the value in the Accumulator Register again, resulting in a new value 00101110.01, equivalent to 46.25 nanoseconds. This value is precisely 256 nanoseconds less than the correct answer since the bit of weight 256 nanoseconds is not carried in the register. This Binary "overflow" is of no significance as a moments thought will indicate that the Binary Comparator will not put out another pulse until the lowest 10 bits of the Counter match the value 00101110.01, which will not occur until precisely another 100.75 nanoseconds have elapsed.

Mathematically, the arithmetic process is being performed "modulo-256 nanoseconds". There will be a stream of pulses from the Comparator for as long as the addition process is repeated, all precisely separated by 100.75 nanoseconds. Thus, if this stream is fed to a Binary Divider Flip-Flop (422) the output will be a square wave of precisely the same two period value, 403 nanoseconds, as was measured by the encoding circuitry.

In the actual implementation of the example, the Binary Counter's least significant bit is equivalent to 16 nanoseconds. Thus the Comparator output pulses will always be early by 0 to 15.75 nanoseconds depending on the state of the bits out of the Accumulator below the 16 nanosecond bit. There are six such bits of weight 8, 4, 2, 1, 0.5, and 0.25 nanoseconds respectively. It is a simple matter to delay the pulses from the Comparator under control of these six low order bits as is indicated in the detailed implementation example illustrated by FIG. 5.

Figure 5:
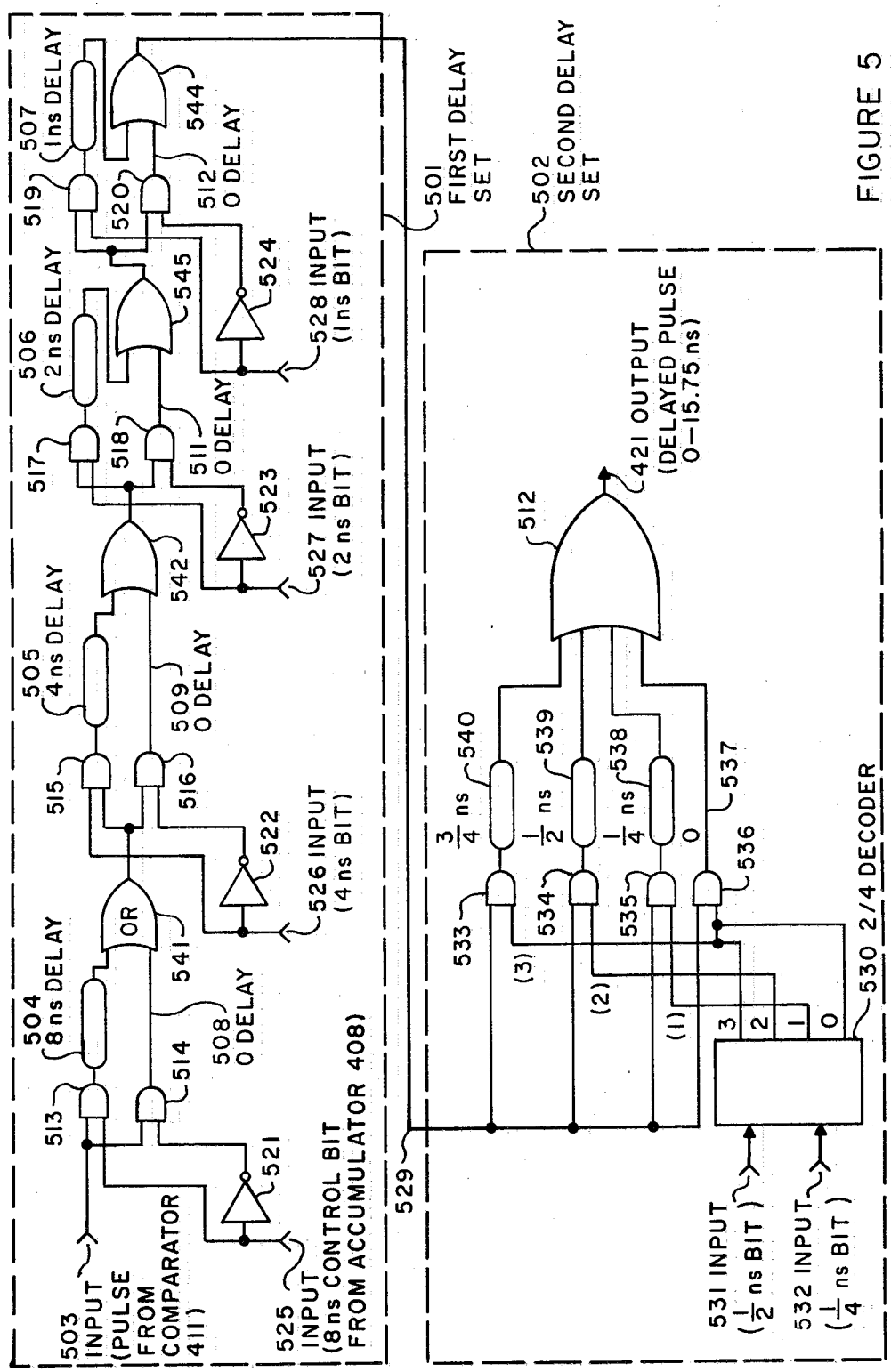
FIG. 5 is a detailed block diagram of the Delay Line section of the Decoder.

FIG. 5 is a detailed block diagram of the Delay Line Sets in which the first and second sets are individually surrounded by dashed lines and are designated by drawing numerals 501 and 502 respectively. The first delay line set comprises a pulse signal input port 503 for the pulse from output of the Comparator 411, four Delay Lines having delays of eight, four, two and one nanosecond and designated by drawing numerals 504, 505, 506 and 507, respectively, four zero Delay Lines designated by drawing numerals 508 through 511, eight solid state Switches or AND Gates designated by drawing numerals 513 through 520, four Inverters designated by drawing numerals 521 through 524, four switch control input ports designated by drawing numerals 525 through 528 and four "OR" Gates designated by drawing numerals 541 through 544.

The first Delay Line Set 501 may be divided into four segments each containing a Zero and Nonzero Delay Line. The first segment includes the eight and zero nanosecond delay lines 504 and 508, the Switches 513 and 514, the "OR" Gate 541 and the Inverter 521. A pulse from the Comparator 411 is fed through the input port 503 to the input terminals of the switches 513 and 514, while a control signal from the Accumulator 408 is fed through Switch Control Input port 525 to the control terminals of Switches 513 and 514. This control signal is fed directly to the control terminal of Switch 513, however, before this signal is supplied to switch 514, it is first passed through the Inverter 521.

An output from Switch 513 is passed through the eight nanosecond Delay Line and through the "OR" Gate 541 to the output of the "OR" Gate, which is also the output of the first segment. Similarly, an output from Switch 514 is passed through the zero Delay Line 508 and through the "OR" Gate 541 to the output of the first segment.

In the operation of the first segment, a pulse from the Comparator is passed through the input port 503 to the input terminals of Switches 513 and 514, and then through one of the Switches, its associated Delay Line (either zero or eight nanoseconds) and finally through the "OR" Gate 541 to the output of the first segment. The closure of one of the Switches to permit the pulse to pass is determined by the eight nanosecond control signal bit on input port 525. The invert circuit 521 insures that when one of the Switches is closed to pass the signal, the other is open. This is accomplished by inverting the control signal to Switch 514. By way of this control signal, either a zero or an eight nanosecond delay may be selectively imparted to the pulse from the Comparator.

The configuration and operation of the remaining segments of the first Delay Line set is identical to that of the first. Each of these segments may, in accordance with its respective control signal, selectively insert its own specific delay which may be four, two or one nanosecond, depending on the particular segment. The total delay including the eight nanosecond delay of the first segment can be set at any value from zero to fifteen nanoseconds in one nanosecond steps.

The Second Delay Line set comprises a 2/4 Decoder 530, with a first input 531 for one-half nanosecond data, and a Second Input 532 for one-fourth nanosecond data, four Switches designated by drawing numerals 533 through 536, four Delay Lines having delays of zero, one-fourth, one-half and three-quarter nanosecond and being designated by drawing numerals 537 through 540, respectively, an "OR" Gate 512, and an output port 421.

In the operation of the second Delay Line set, the pulse leaving the output of the "OR" Gate 544 in the last segment of the first Delay Line is transmitted on line 529 to the input terminals of Switches 533 through 536. One of the Switches is turned on by a control signal from the 2/4 Decoder 530 which in turn is controlled by a signal received at the control input ports 531 and 532 of Decoder 530. The Switches 533 through 536 have a Delay Line of three quarters, one-half, one-quarter and zero nanoseconds, respectively, connected in series with their outputs. All of these Delay Lines are terminated in an input port of the "OR" Gate 512.

The closed Switch passes the pulse from the first Delay Line set through its respective Delay Line and through the "OR" Gate 512 to the output of this "OR" Gate, which also forms the output of the second Delay Line set. By appropriate control signals, it is possible with the Second Delay Line set to impart an additional delay to the pulse ranging from zero to three-quarters nanosecond in one-quarter nanosecond steps. The first and second Delay Line sets combined provide a delay range of 0 to 15.75 ns in one-quarter nanosecond steps.

The two groups of Delay Lines shown in FIG. 5 as examples have been reduced to practice in a prototype Decoder. The first Delay Line set places a number of binary weighted delays in series. Thus, there is an 8 nanosecond, 4 nanosecond, 2 nanosecond, and 1 nanosecond line that may be gated in and out of the series path. The next four bits below 16 nanoseconds in the Accumulator Register 408 control the switches so that a delay differential of from 0 to 15 nanoseconds may be inserted. For example, if the control bits are 1001, the pulse from the Comparator 411 will be delayed by 8 nanoseconds and one nanosecond for a total of 9 additional nanoseconds as compared to the delay where the control bits were all zero, 0000. Note that the fixed delay (for all zeros) is not important as it merely causes a phase shift, not a frequency shift, in the output square wave. If, as an example, the first pulse from the Comparator is delayed by 9+t nanoseconds, because the control word is set to 1001, and the next pulse is only delayed by t nanoseconds because the control word has been changed to 0000, there will be a precise shortening of the output square wave one-half period by 9 nanoseconds.

The second Delay Line set provides delays from 0 nanoseconds to 0.75 nanoseconds in 0.25 nanosecond steps by means of four delay paths in parallel. Although 3 Delay Lines are required for this type of parallel arrangement, as opposed to only two (a 0.5 and a 0.25) for a series arrangement, it has the advantage, particularly for these very short delays which are implemented by short lengths of wire, of being more easily trimmed and calibrated to the accuracy required.

As indicated, the above described implementation is merely an example of one possible Decoder embodiment. It is important to note that just as the Encoder achieves a time resolution of $\frac{1}{8}$f to 1/16f, where f is the maximum operating frequency at which the devices (Flip-Flops) are capable of operating, so the Decoder employs these same devices to achieve output resolution equivalent to at least 1/32f to 1/64f per one-half period. In addition, since the binary arithmetic devices need only operate within the one-half period rate of the square wave input, which is normally at least 100 times slower than the encoding resolution, the typical required computation rates are only about f/10, or less.

The prototype unit noted above demonstrated a capability for replicating an approximately 5 MHz signal to an accuracy of one-quarter nanosecond for one-half period or about 12.5 KHz per 400 nanoseconds. Obviously, if the measurement is repeated on a CW signal, every 400 nanoseconds, the average output frequency will approach arbitrarily close to the input frequency. Furthermore, by simple calibration means, the output can be brought into phase synchronism with the input, also to a precision of one-half or one nanoseconds which represents a phase accuracy of about 0.9 to 1.80 degrees. This phase precision has been demonstrated in the prototype Encoder/Decoder.

Depending on the stability of the Local Oscillator, this accuracy can be extended to an RF input, either pulse or CW, by means of the up and down conversion mixers. The prototype unit was designed to operate over an input range, after down conversion, of approximately 3 to 8 MHz. Therefore, the input RF need only be measured to an accuracy of about ±2.5 MHz, in order to employ a precision frequency synthesizer to set the LO frequency for use by the Encoder/Decoder device.

The subject invention thus achieves performance using state-of-the-art components, beyond any coherent storage and replication system currently available. The data in storage is at an information theoretic minimum and an RF pulse or CW input can be sampled to achieve a CW output with minimal "head-to-tail" repeat phase transients. Alternatively, input coherent RF pulses (pulse-Doppler signals) can be stored and replicated with arbitrary delay with high phase coherence.

It should be noted that the present invention is capable of reproducing signals where only a one-half cycle sample is provided. In view of this, the received signal may change in frequency or phase and the change will be detected and stored. A sufficient storage capability will enable this system to reproduce the modulated signal accurately. A highly effective system may be made to reduce the total storage required to replicate FM and phase modulation signals by combining with the present invention the sampling system described in my prior filed application Ser. No. 302,194, entitled "Adaptive Bandwidth Signal Encoder".

In the basic operation of the Adaptive Bandwidth Encoder System, a pulsed signal is divided into a number of sampling periods. The frequency within each sampling period is then determined and stored. This system differs from prior art systems where either the average frequency of the entire pulse is measured (deleting FM modulation) or at the opposite extreme, each cycle is measured and stored (requiring a prohibitively high storage capacity).

Figure 11:
FIG. 11 is a block diagram of a modification to the present invention as presented in FIG. 1 where samples of the signal to be replicated are designated to permit the reproduction of signals containing FM modulation.
Figure 11:
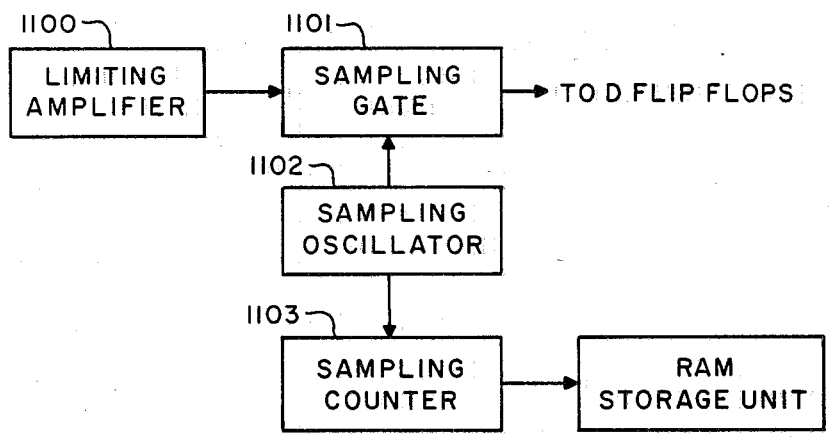

FIG. 11 illustrates a modification to the invention as presented in FIG. 1. This modification incorporates the adaptive bandwidth encoder technique in the present invention to permit the replication of signals having FM content. This Figure includes a Sampling Gate 1101, a Sampling Oscillator 1102, and a Sampling Counter 1103.

In the operation of the circuit in this Figure, the Oscillator supplies a signal to the sampling gate and to the counter. The Gate divides the signal passing through the Limiting Amplifier 107 into samples as illustrated by the signal 1104 prior to sampling and 1105 after sampling. Each sample is measured to determine the period in the manner described in connection with the system shown in FIG. 1. Each period is then stored in the RAM Storage Unit; however, a designation as to the order and relative time of occurrance of the sample from which the period was determined is entered along with the period information to permit reconstruction of the original signal including any FM content.

Although the present invention has been shown to be useful in a specific embodiment where the purpose is the reproduction of a signal to great frequency and phase accuracy, the invention also has general usefulness for applications requiring ultra high precision in measuring the time of occurrance of an event with respect to some reference timing device. Such timing devices are conventional and usually consist of a series of frequency dividers (Flip-Flops, as an example) driven by a high frequency Clock Oscillator. The timing precision for such a device alone is limited to the capability of the highest frequency divider. For example, if the limiting clock frequency is f, the precision limit will be 1/f.

The subject invention provides a means whereby a divider such as a Flip-Flop with a frequency capability f may be used in fabricating a timing device that has a time resolution capability on the order of ⅛f minimum, and approaching 1/16f with careful design.

Since a "pipeline" processing approach (Tapped Delay Line in the example) is employed, a single device is limited to measuring the time of occurrence of more than one event to events spaced by at least 1/f on the average. However, as is illustrated by the block diagram of FIG. 6, additional pipelining of the events themselves may be employed to measure the time of occurrence of multiple events within a time interval 1/f, to the same precision (⅛f to 1/16f).

Figure 6:
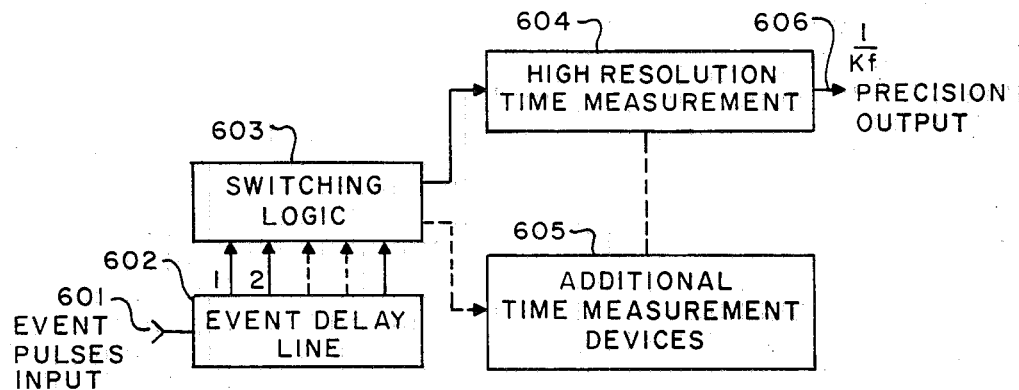
FIG. 6 is a block diagram of a system employing the present invention designed to precisely measure time of occurrance.
Figure 7:
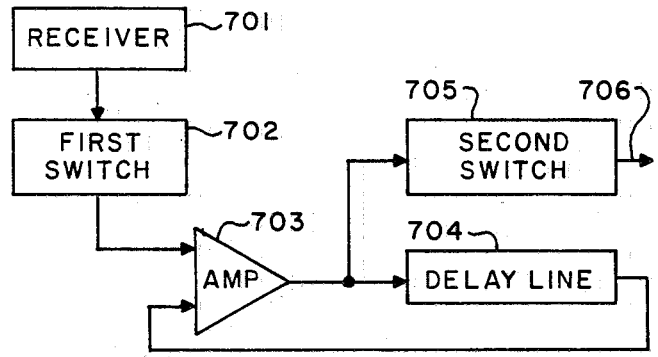
FIG. 7 is a diagram of a prior art signal replication system using a Circulating Delay Line.
Figure 8:
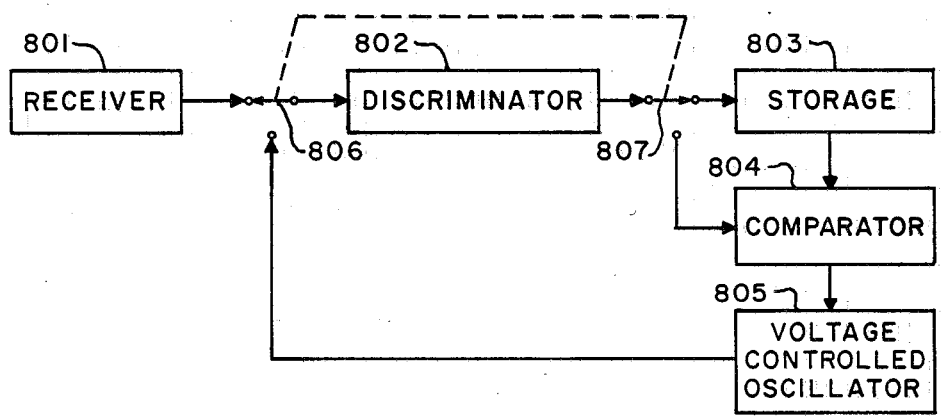
FIG. 8 is a diagram of a prior art signal replication system which includes a Discriminator and Oscillator with a Feedback loop to compare at the Discriminator and Oscillator signal with the originally received signal.
Figure 9:
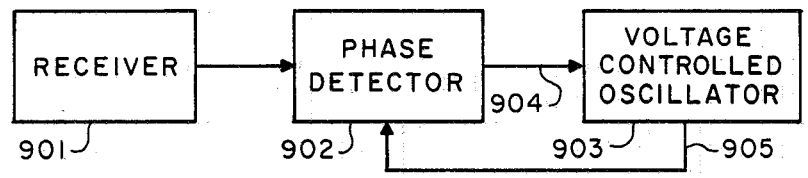
FIG. 9 is a diagram of a prior art signal replication system using a Phase Locked Loop.
Figure 10:
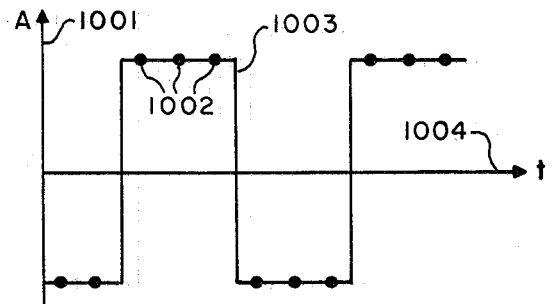
FIG. 10 is a diagram illustrating a prior art encoding system where a high rate of sampling and a large storage capacity is required for the replication process.

FIG. 6 comprises an input port 601, an Event Delay Line 602, a Switching Logic Section 603, a High Resolution Time Measuring Device 604, additional Time Measuring Devices 605 and an Output port 606.

In the operation of this system, an event pulse is supplied to the event Delay Line 602 by way of input port 601. The taps on the Delay Line supply the pulse signal to the Switching Logic Section 603. The output of the Switching Logic Section is supplied to the High Resolution Time Measuring Device 604. The output of the High Resolution Time Measuring Device is then supplied to the output port 606. The additional High Accuracy Devices 605 also receive the output from the Switching Logic Section and are needed only if the average event input rate exceeds f.

In the operation of this circuit, the Switching Logic takes the first event pulse from the first tap on the Delay Line and then blocks pulses from the remaining taps. If there is a continuous input of events spaced at less time than 1/f, the Logic Section distributes the events to multiple measuring devices.

Having described my invention, I claim:

1. Apparatus for accurately determining the period of a signal to be measured, and for digitally encoding and storing the period information, where only one-half period of the signal to be measured need be supplied and the minimum number of bits are required for storing said information, comprising:
  (a) a Clock Signal Source where the clock frequency exceeds that of the signal to be measured,
  (b) a Tapped Delay Line having an input port and a plurality of taps for output ports where the taps are at intervals along the line which are a fraction of the clock frequency period, the Delay Line receiving at its input port the clock signal,
  (c) a plurality of Means for Switching, each having two input ports and one output port, and each switching state at the coincidence of two input signals, each input signal being supplied to separate input ports, the means for switching remaining in the switched state until reset, one of each such means for switching being provided for each tap on the Delay Line and each being connected to receive a signal from its respective tap at its first input port, and each also being connected to receive the signal to be measured at its second input port,
  (d) a Counter having an input port and an output port and being connected to receive at its input port the clock signal,
  (e) a Shift-Register-Code-To-Digital-Code-Converter, referred to as the Code Converter, said Code Converter being connected to receive from the output port of each Means for Switching an indication of the state of each, and convert all such indications to a digital code representing the position of the clock signal on the Tapped Delay Lines after the Means for Switching have been switched,
  (f) a Digital Register connected to receive as inputs the output of the Code Converter and the output of the Counter and to combine and temporarily store both, the combined inputs to the Digital Register representing an accurate time of occurrence measurement of a leading edge of the signal to be measured, with the Counter output constituting a time measurement accurate to one clock period, and the position of the clock signal on the Delay Line at the time of coincidence, as indicated by the states of the Means for Switching, constituting a measurement of the time of occurrence of a leading edge of the signal to be measured accurate to the time interval between delay line taps, (g) a Period Computing Means connected to the Digital Register to receive and store the time of occurrance of a first and a second coincidence of input signals to the Means for Switching and subtract the two to provide a measurement of the period of the signal to be measured, and (h) Means For Storing connected to the Period Computing Means to receive and store the measured period of the signal to be measured.

2. Apparatus as claimed in claim 1, wherein:
(a) the length of the Tapped Delay Line is equal to one-half the period of the Clock signal,
(b) the taps on the Tapped Delay Line are separated by equal delays, and
(c) the Means for Switching are Flip-Flops.

3. Apparatus as claimed in claim 1, further comprising a Threshold Detector connected to receive the signal to be measured and supply an output equivalent to the received signal when it exceeds a threshold level, and also further comprising a Comparator Means connected to receive the output of the Shift-Register-Code-To-Digital-Code-Converter and the output of the Threshold Detector, and to transmit an output signal which serves as a load enable signal to the Digital Register to enable the Digital Register to accept the output of the Digital Counter only after the Counter has settled, the output signal of the Comparator Means being effectively the through transmission of the Threshold Detector output, which is direct when the counter has had sufficient time to settle after receiving a clock signal and which is delayed by a specified fraction of the clock period when there has not been sufficient time for the counter to settle, the time after the receipt of a clock signal by the Counter being determined by the position of the clock signal on the Tapped Delay Line as reflected through the Code Converter.

4. Apparatus as claimed in claim 3, wherein said Comparator Means comprises:
(a) a first input port of the Comparator Means to accept the output of the Threshold Detector,
(b) a second input port of the Comparator Means to accept the output of the Shift-Register-Code-To-Digital-Code-Converter,
(c) a Delay Line having a delay equal to a fraction of the clock period and connected at its input port to the first input port of the Comparator Means,
(d) a first AND Gate having two input ports with its first input port connected to the first input port of the Comparator Means and its second input port connected to the second input port of the Comparator Means,
(e) an Inverter having its input port connected to the second input port of the Comparator Means,
(f) a second AND Gate having its first input port connected to receive the Delay Line output and its second input port connected to receive the Inverter output, and
(g) an OR Gate connected to receive at one input port the output of the first AND Gate and its second input port connected to receive the output of the second AND Gate, the output of the OR Gate constituting the output of the Comparator which is supplied as a load enable signal to the Digital Register.

5. Apparatus as claimed in claim 4, wherein the fraction of the clock period by which the Threshold Detector output is delayed is one-half period.

6. Apparatus as claimed in claim 1, further comprising:
(a) Means for Sampling the signal to be measured at specific intervals,
(b) Means for Supplying said samples to the Means for Switching as the signal to be measured,
(c) Means for Designating Successive Samples in time and order, and
(d) Means for Supplying the designations to the Means for Storing to designate each period stored as to the particular sample from which it was derived to permit accurate replication including FM modulation and bi-phase coding of the signal to be measured.

7. Apparatus as claimed in claim 1, including a Decoder for replication of the signal to be measured from its stored period, comprising:
(a) Means For Accepting the stored period information from the Means for Storing,
(b) a Second Comparator for receiving the output signal of the Counter and the period information from the Means for Accepting to provide a series of output pulses separated by a time no greater than one-half cycle of the stored period with a resolution of one cycle of the Clock,
(c) a Variable Delay Line Means for receiving an output from the Means for Accepting as a control signal to vary the delay an amount corresponding to the period information determined by the Tapped Delay Line and the low order bits from the Counter, referred to as computed fine period information and said Variable Delay Line also accepting the output pulse train from the Comparator as an input to be delayed in order to adjust the time between pulses in accordance with the computed fine period information, and
(d) a Flip-Flop for receiving the pulse train output from the variable delay line and converting it to a signal having a total period at least equal to the total period of the signal to be measured with an accuracy equal to the delay between the taps of the Tapped Delay Line.

8. Apparatus as claimed in claim 1, further comprising Means for Inversion to invert the negative going leading edges of the signal to be measured in order to produce a positive leading edge for both the initially positive leading edges and also for the negative leading edges and thereby cause the apparatus as recited in claim 1 to measure and function on a single one-half cycle period of the signal to be measured, said Means for Inversion being connected to receive the signal to be measured prior to any other processing and then supply this signal after so inverting to the apparatus recited in claim 1.

* * * * *